UNITED STATES PATENT OFFICE.

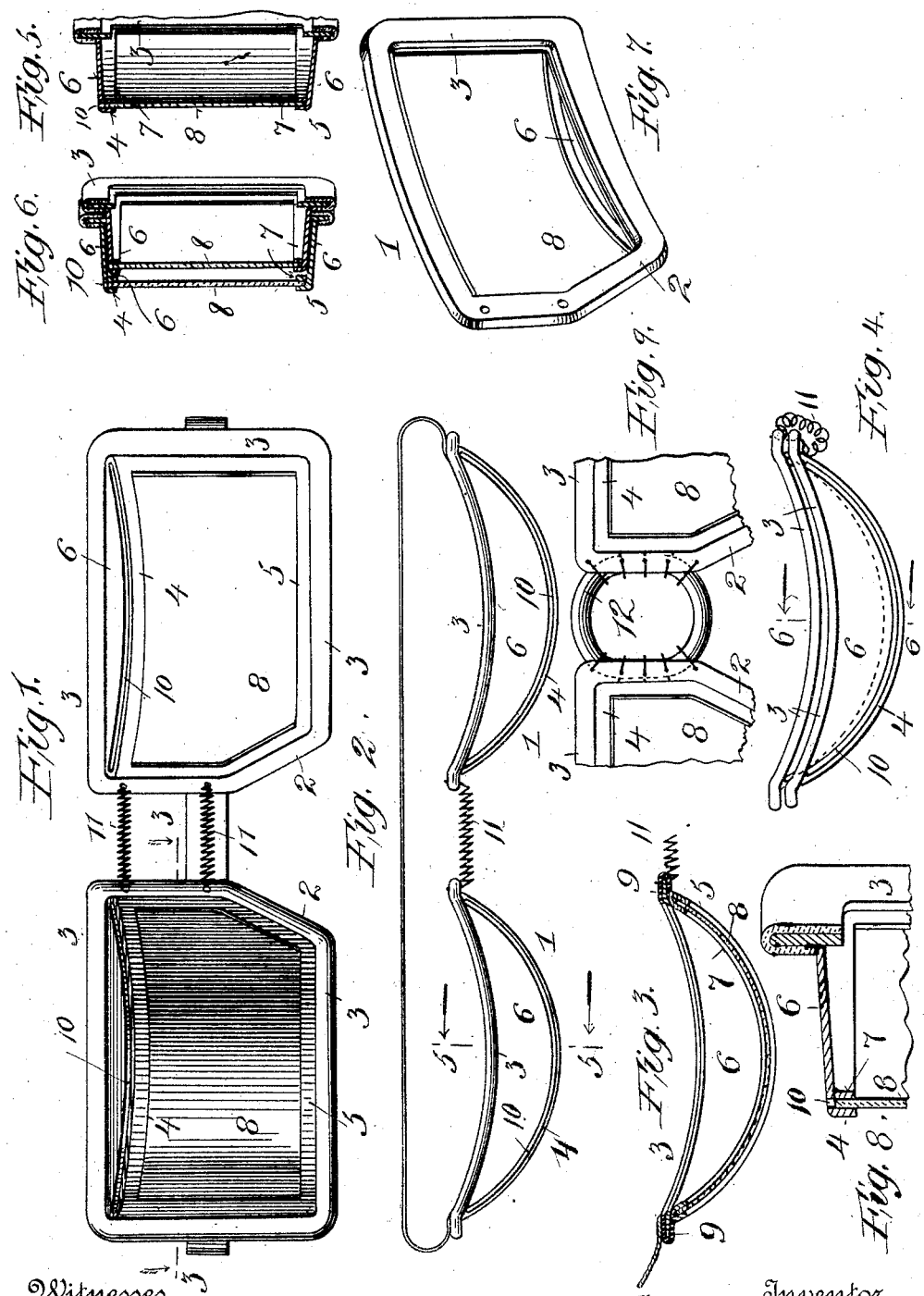

FRANK M. SLEVIN, OF JERSEY CITY, NEW JERSEY, ASSIGNOR TO SOLOMON C. HIRSCHBERG, OF NEW YORK, N. Y.

GOGGLES.

No. 901,394.   Specification of Letters Patent.   Patented Oct. 20, 1908.

Application filed June 20, 1906. Serial No. 322,564.

*To all whom it may concern:*

Be it known that I, FRANK M. SLEVIN, a citizen of the United States, and a resident of Jersey City, county of Hudson, and State of New Jersey, have invented certain new and useful Improvements in Goggles, of which the following is a description.

My object is to provide goggles, particularly of the class worn by autoists, which are designed to protect the eyes from dust and wind, and to overcome the great objection of limited vision heretofore experienced in such as have been previously made.

My object is to provide a goggle which will properly fit the wearer to prevent dust etc., from the eyes, and in which the wearer will have an unobstructed vision as great as he would have without any goggles at all. This is highly important. If there is anything to obstruct the vision when looking in any direction the wearer is thereby annoyed. As is well known, articles of this kind are used by persons on fast moving vehicles, and it is desirable to have great freedom in changing the point of vision from straight ahead to one side or the other. The movement of the eye is much quicker than if the head has to be moved, as is the case when the vision is limited by the goggles.

My object is also to provide an efficient connection between the cups of the goggles whereby they may be twisted and then folded, one upon the other for compactness.

My invention also contemplates the provision of means for having the glass removable and interchangeable, whereby one color glass may be readily substituted for any other.

In the drawings forming part of this application, Figure 1 is a front elevation of my improved goggle. Fig. 2 is a plan view of the same. Fig. 3 is a section on the line 3—3 of Fig. 1. Fig. 4 is a plan view of the goggle when folded. Fig. 5 is a section on the line 5—5 of Fig. 2. Fig. 6 is a section on the line 6—6 of Fig. 4. Fig. 7 is a perspective view of one half of the frame. Fig. 8 is a section of a part of one of the cups showing the glass socket, and—Fig. 9 shows a modified form of connection for the cups.

The frame of the goggle is made in two parts, each of which I will call a cup.

As illustrated by my invention, each of the cups is composed of a frame 1, which I preferably make substantially rectangular, with one corner shortened at 2, to be free of the nose of the wearer. The frame consists of the curved plate 3, which is adapted to fit over the eye of the wearer, and outwardly curved upper and lower bands 4 and 5 which are secured to plates 6. The bands 4 extend downwardly from the upper plate 6, and the band 5 extends upwardly from the lower plate. Inside of and parallel to the bands 4 and 5 are secondary bands 7 spaced sufficiently to form a socket between the bands for the reception of the glasses 8.

As will be seen in the plan views, the plate 3 is curved to conform to the wearer, and the bands 4 and 5 are given a greater curve so as to be separated from the former and to return at each end, where they are secured by bending the ends 9 over the plate 3. (See Fig. 3.) The glass 8 is bent in such a shape that it will fit in the socket formed by the several bands. The top plate 6 has a slot 10 so that the glass may be inserted from the top. By this means the glass may be readily removed, and a similar one of a different color may be substituted as desired.

The cups are connected by a flexible and resilient connection so that they may be twisted and then folded, one in the other, as shown in Fig. 4, so as to be compact, taking up only half the space they otherwise would. By making the connection resilient, there is a tendency to resume a natural position when unfolded, so that the cups will be properly held on the wearer. The connection shown in Fig. 2, consists of a plurality of springs 11 which have their ends connected to the cups. These springs allow for the twisting and folding of the cups.

In Fig. 9 is shown a modification of the connection. In this a rubber tube 12, in the form of a circle, is secured to each frame section and being flexible and resilient it allows the cups to be twisted and folded. This form may be desirable as it would not be uncomfortable where the tubing comes in contact with the wearer.

One important feature of my invention is that I am able to use bent glasses instead of having to use a ground glass.

Heretofore the goggles have been so made that the wearer could not look in all directions without turning the head, owing to some portion of the frame obstructing the vision. In this goggle this obstacle is done away with because when on the wearer, the frame extends back beyond the eye, and the glass likewise is bent and extends back beyond the eye, thus giving a clear vision as great as is possible with the naked eye.

Having described my invention, what I claim is:

A goggle composed of a frame having eye cups, composed of frame plates 3, outwardly curved bars 4 and 5 which return to substantially the plane of the plates 3, glasses 8 bent to conform to the curve of the bars 4 and 5, said glasses being removable therefrom, and a resilient and flexible connection between said eye cups.

Signed this 15th day of June, 1906.

FRANK M. SLEVIN.

Witnesses:
GUSTAVE I. AUNOW,
CHAS. G. HENSLEY.